O. EPPENSTEIN.
COINCIDENCE TELEMETER.
APPLICATION FILED NOV. 15, 1912.
1,074,935.
Patented Oct. 7, 1913.
2 SHEETS—SHEET 1.
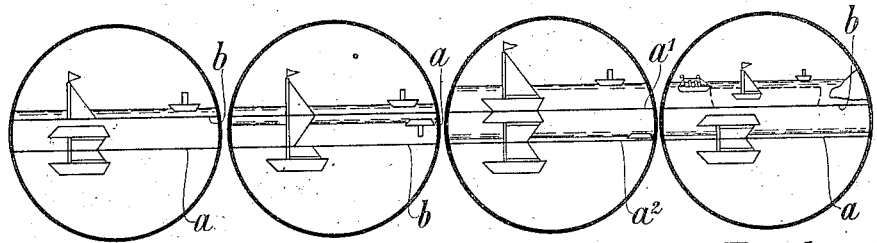
Fig.1  Fig.2  Fig.3  Fig.4
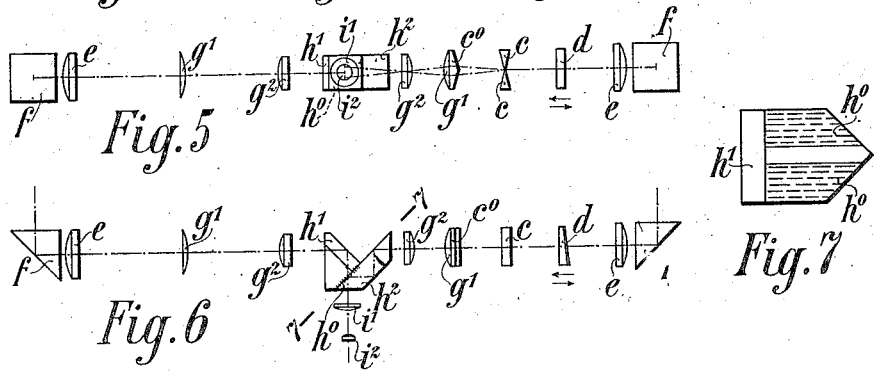
Fig.5
Fig.6  Fig.7
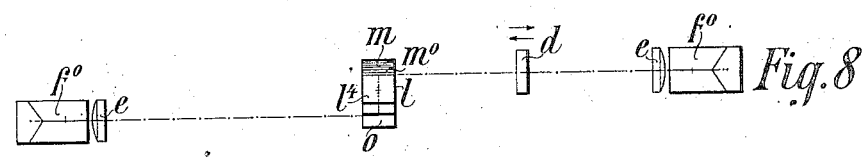
Fig.8
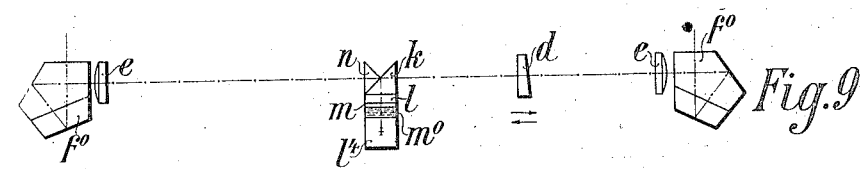
Fig.9
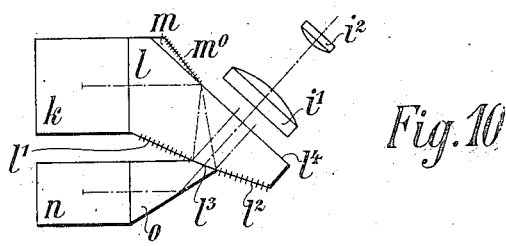
Fig.10
Witnesses:
Paul Kruger
Richard Hahn
Inventor:
Otto Eppenstein

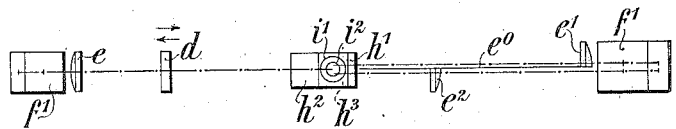
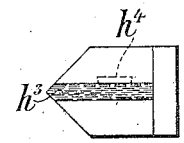
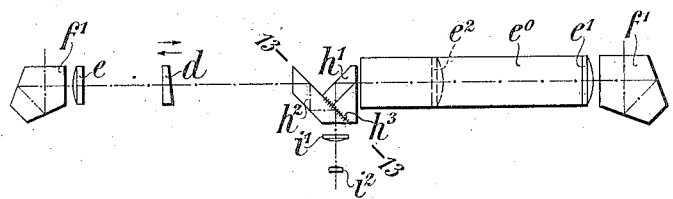
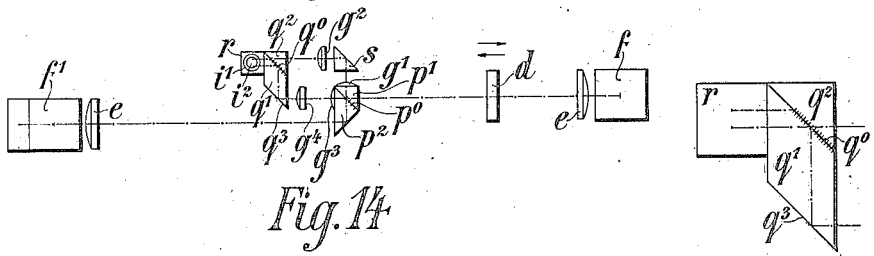
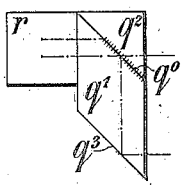
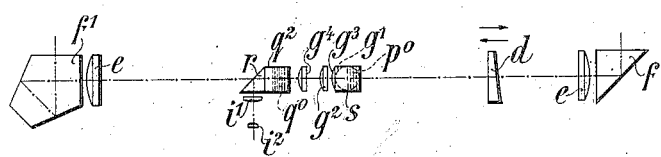
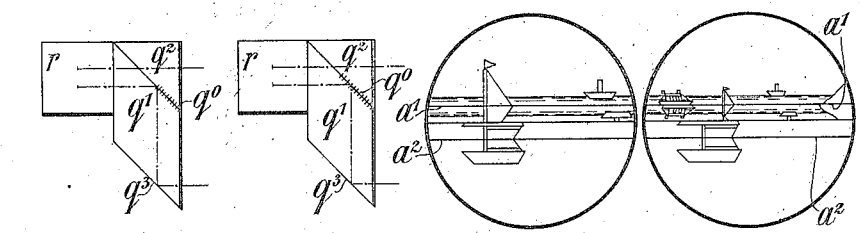

UNITED STATES PATENT OFFICE.

OTTO EPPENSTEIN, OF JENA, GERMANY, ASSIGNOR TO THE FIRM OF CARL ZEISS, OF JENA, GERMANY.

COINCIDENCE-TELEMETER.

1,074,935. Specification of Letters Patent. Patented Oct. 7, 1913.

Application filed November 15, 1912. Serial No. 731,602.

*To all whom it may concern:*

Be it known that I, OTTO EPPENSTEIN, a citizen of the German Empire, residing at Jena, Germany, have invented a new and useful Coincidence-Telemeter, of which the following is a specification.

The invention relates to uniocular telemeters, in the total image-field of which three single image-fields follow one upon the other in a direction perpendicular to that of the base-line. The two outer single image-fields are each filled by an erect image, the inner one contains an image, which is contiguous to one of the said erect images in a straight line, the contiguous images belonging to opposite ends of the base-line and having such a relative position in the height-direction, that their common boundary-line is a line of coincidence. While it is immaterial in applying the invention, whether the base-line is vertical or horizontal, it is in the following always assumed to be horizontal. Similarly the assumption, which is certainly not essential but still convenient in applying the invention, shall be made, that the inner single image-field extends in the form of a band across the entire field of vision.

Assuming in the well-known telemeter that one of the two images filling the outer single image-fields, which lies as viewed from the line of coincidence beyond the middle single image-field, as being produced through this latter single image-field, it would contain in the line of coincidence the same object-points as the image filling the outer single image-field on the near side of the said middle single image-field (the terms "remote" and "near" are hereinafter used, for the sake of brevity, to indicate the positions just described); there would therefore correspond to that one of its image-lines, which would coincide with the line of coincidence, in the other image an image-line, which also coincides with the line of coincidence. In these two erect images taken together, to which in the following the term "outer images" is applied, a piece is missing, viz. that corresponding to the inner single image-field. When this single image-field is filled by an erect image, the latter certainly contains the missing piece, all the same the clearness is disturbed by parts of this image being displaced in a direction parallel to that of the base-line relatively to the outer images. When the inner single image-field is filled, as is usually the case, by an image inverted perpendicularly to the direction of the base-line, the piece missing from the outer images does not appear in the image-field at all. In order to remove this disturbance of the clearness by the inner image independently of the height of the inner single image-field, according to the present invention the outer single image-field, which is not contiguous to the line of coincidence, is filled by an image, which is so constituted, that to that one of its image-lines, which, on this image being produced through the inner single image-field, would coincide with the line of coincidence, in the other outer image there corresponds an image-line at a distance from the line of coincidence, which is at least equal to the height of the inner single image-field. There then appears in the remote outer single image-field at least that piece, which so far was missing from the outer images. It is even an advantage for the clearness to be obtained, to choose the distance of such a size, that the zone, with which the near outer image is contiguous to the line of coincidence, is repeated in the remote outer single image-field. Independently of the size given to this distance the field of vision in the remote image may be enlarged, without prejudicing the accuracy of measurement in the near one, by giving the said remote image a less magnification. This enlarged field of vision may then be utilized, especially when in it the zone, which is contiguous to the line of coincidence, is repeated, like the field of vision of a finder-telescope.

Those telemeters, the inner single image-field of which is filled by a single inverted image, have in all those cases, in which the outer images taken together are without a gap, the special advantage, that almost for every object the lower and upper limiting line of the said single image-field may each act equally well as the line of coincidence. Only for an object, in which exclusively an extremity at its upper or lower end respectively is suitable for measuring purposes, the lower or the upper position respectively of the line of coincidence would be preferable.

In that form of the well-known telemeter, in which the inner single image-field is filled by a single inverted image, there is requisite for a change of the line of coincidence a relative displacement of the inner image and the outer images by twice the height of the former. On examining the matter more closely it is obvious, that in this relative displacement besides the inner image only that outer image need take part, the limiting line of which is to become through the change a line of coincidence. When the remote outer image is disposed according to the present invention, this relative displacement of the remote outer image and the inner one may, when the magnification is equal in the total image-field, be considered as already partly effected from the first. For the change of the line of coincidence it is then only necessary to supplement the relative displacement so far as to become equal to double the height of the inner single image-field. The more the remote outer image is from the first disposed in a displaced position, the smaller is the relative displacement still required for the change of the line of coincidence. There is only required e. g., when the remote outer image is so disposed that there corresponds to its boundary-line in the other outer image the line of coincidence, when the said former image may therefore be regarded as being from the first displaced, as compared with its position in the well-known telemeter, by the height of the inner single image-field, for changing the line of coincidence a further relative displacement by the single height of the inner single image-field. When the two outer images are disposed in their relative position in such a manner that to the boundary-line of one of them there corresponds in the other one an image-line, which has from the boundary-line of the latter a distance equal to the height of the inner single image-field, no further relative displacement at all is required for changing the line of coincidence, both limiting lines of the inner single image-field being from the first lines of coincidence.

The two outer images may both belong to the same or to opposite ends of the base-line.

When both outer images are made to belong to the same end, a relative position as to height corresponding to the invention of corresponding image-lines of the outer images may be effected by a refracting prism or by two such prisms, e. g. by placing in front of the image-plane in the path of the ray-pencil-system, from which the two outer images are formed, a pair of such refracting prisms, the refracting edges of which are in contact with each other. By this means the two parts of the ray-pencil-system, which furnish the two outer images, are made divergent, so that these images find themselves moved apart. In a separating prism system these images are then combined with the filling belonging to the other end of the base-line of the inner single image-field either directly or with the help of two systems of lenses of reversion in such a manner that this filling comes to lie between them. In place of the refracting prisms there may also be employed for causing the divergence two reflecting surfaces, which are inclined to each other, with which arrangement there is combined a common greater deflection of the two parts of the pencil-system. The divergence of the two parts of the pencil-system may be totally or partially neutralized by further refraction or reflection before entering the separating prism system. The separating prism system can itself be so formed as to cause the divergence by refraction or reflection, and the separating surfaces can be so disposed as to neutralize the divergence.

When both the outer images are to belong to the same end of the base-line, a filling of the image-fields, corresponding to the invention, may also be obtained by disposing at that end of the base-line, to which the two outer images belong, instead of one objective lens two objective part-lenses, the optical axes of which lie parallel to each other in a plane perpendicular to the plane of triangulation. The images, which are formed by these part-lenses and lie moved apart, are then united in a separating prism system with the filling belonging to the other end of the base-line of the inner single image-field in such a manner that this filling comes to lie between them.

A substantially different method complying with the invention, in which method the outer images may belong to the same or to opposite ends of the base-line, is the following one: In a separating prism system in the first place two double images are formed from the ray-pencil-systems belonging to the two ends of the base-line. These two double images, one or the other of which may optionally be regarded as the product of the otherwise lost rays, are then united in such a manner that the total image presented to the ocular consists of two principal parts, one of which proceeds from one of the double images and contains one of the outer images and the other of which proceeds from the other double image and contains the other outer image.

In the annexed drawing: Figures 1 to 4 each show the total image-field presented by a telemeter according to the invention, the inner single image-field of which said total image-field is filled by an image inverted in a direction perpendicular to that of the base-line. Figs. 5 and 6 show in elevation and plan respectively the optical system of a constructional example of the telemeter according to the invention. Fig.

7 is a section on an enlarged scale along line 7—7 of Fig. 6 through the separating prism system of this telemeter. Figs. 8 and 9 show in elevation and plan respectively the optical system of another constructional example of the telemeter, presenting a total image-field such as that shown in Fig. 1. Fig. 10 is an enlarged end view of the separating prism system of this telemeter showing the inclined position of the ocular lenses. Figs. 11 and 12 show in elevation and plan respectively the optical system of a third form of the telemeter, presenting a total image-field corresponding to that shown in Fig. 4. Fig. 13 is a section on an enlarged scale along line 13—13 of Fig. 12 through the separating prism system of this telemeter. Figs. 14 and 15 show in elevation and plan respectively the optical system of a fourth form of the telemeter, having two separating prism systems and presenting a total image-field corresponding to Fig. 1. Fig. 16 is an enlarged front elevation of one of the separating prism systems of this telemeter. Fig. 17 shows another form of this system, to which a total image-field such as that shown in Fig. 2 corresponds. Figs. 18 and 19 show a third form of this system and the total image-field corresponding to it respectively. Fig. 20 shows a total image field corresponding to another modification of the separating prism system of Fig. 18.

In Figs. 1 and 2 the inner single image-field is bounded by the line of coincidence $a$ and by a line $b$ parallel to $a$, the line of coincidence forming in Fig. 1 the lower boundary of the said image-field and in Fig. 2 its upper boundary. The remote erect image has the same magnification as the other images and is so disposed that to that one of its image-lines, which on this image being produced through the inner single image-field would coincide with the line of coincidence, there corresponds in the near erect image an image-line, the distance of which from the line of coincidence is equal to the height of the inner single image-field. Therefore in Fig. 1 the two outer single image-fields together show the sailing boat without any portion missing, and the horizon and a steamer have come in sight. In Fig. 2 the sailing boat as seen in the two outer single image-fields together is also complete.

In Fig. 3 also the same magnification obtains throughout the total image-field. The relative position as to height of the two erect images is such that in each of these two images the distance of that image-line, which corresponds to the boundary-line of the other image, from its boundary-line is equal to the height of the inner single image-field. The relative position as to height of the two erect images on the one hand and the inverted image on the other is in consequence such that in the upper boundary-line $a^1$ and in the lower one $a^2$ there is coincidence simultaneously between each of the contiguous images. Either of the two lines of coincidence may optionally be used for the purpose of measurement.

In Fig. 4 the upper erect image is of smaller magnification and so disposed that the zone, with which the lower erect image is contiguous to the line of coincidence $a$, is repeated above the upper limiting line $b$ of the inner single image-field. Through the enlargement of the field of vision beside the object to be measured a third vessel and the coast have become visible. The dotted lines, which may be taken as corresponding to lines of demarcation disposed in the focal plane of the ocular, serve for indicating that piece of the upper erect image, which corresponds to the piece of the lower erect image recurring in the said upper image.

The telemeter in Figs. 5 and 6 has the same magnification throughout the total image-field. The inner single image-field is filled by an inverted image belonging to the left-hand end of the base-line and the outer images belong to the right-hand end of the base-line. By means of two refracting prisms, $c$, $c$, which are contiguous with their refracting edges, the two parts of the pencil-system, giving the upper and lower outer image respectively, are rendered divergent. In the intermediate zone arising from the moving apart of these two images there lies a production of each image, becoming constantly less luminous. In the middle of the intermediate zone, where both productions are of equal luminosity, the superposition causes a disturbing effect, at the margins of the intermediate zone, however, the productions of the images are serviceable, as there one exceeds the other considerably in luminosity. The divergence is neutralized by a refracting double prism $c^\circ$, which is disposed in the immediate neighborhood of the image-plane. A glass wedge $d$, which is disposed behind the right-hand objective lens $e$ and is adapted to be displaced longitudinally, indicates the measuring device. The objective prisms $f$ are disposed as the foremost members of the system. By means of a collective lens $g^1$, which is cemented together with the double prism $c^\circ$, and a lens of reversion $g^2$ the images belonging to the right-hand end of the base-line are imaged in a separating prism system $h^1$, $h^2$. Similarly the image belonging to the left-hand end of the base-line is imaged by means of a collective lens $g^1$ and a lens of reversion $g^2$. The separating layer $h^\circ$ is divided into two parts; hence it presents two separating edges, as may be seen from the section along the separating layer of the separating prism system $h^1$, $h^2$ in Fig. 7. According as the inverted image is adjusted in the height direction the lower or upper limiting line of the inner single image-field may serve as the line of coincidence. A Ramsden ocular is indicated by the two lenses $i^1$ and $i^2$. According as the two erect images are adjusted with regard to their relative position as to height, either the missing piece of these images can be recovered as in Figs. 1 and 2 or, when the above mentioned intermediate zone is made partially visible, on the side remote from the inverted image in the first place a repetition of the zone contiguous to the line of coincidence of the near erect image may be obtained. When so much of the intermediate zone is permitted to become visible as corresponds to the height of the inner single image-field, both boundary-lines of this single image-field are lines of coincidence, and the filling of the total image-field corresponds to Fig. 3.

In Figs. 8 and 9 the ocular lenses $i^1$, $i^2$, which in the telemeter there shown are disposed so as to permit an inclined direction of inspection, are omitted, as are the objective systems $f°$, $e$ in Fig. 10. The ray-pencil-system belonging to the right-hand end of the base-line and presenting the two erect images is transmitted by the reflecting prism $k$ to the prism $l$ of the separating prism system, to which is cemented a glass wedge $m$ having a silvered reflecting surface $m°$. The surfaces $l^1$ and $l^2$ of the prism $l$ also carry silver layers, which act as separating layers. The wedge $m$ is disposed in such a manner that its edge is hit by the axial ray of the pencil-system. The ray-pencil-system belonging to the left-hand end of the base-line and presenting the inverted image is transmitted by the reflecting prism $n$ to the reflecting prism $o$ of the separating prism system, which is contiguous to the prism $l$ of this system in the cemented surface $l^3$. By one part of the ray-pencil-system belonging to the right-hand end of the base-line impinging on the reflecting surface $m°$ and the other part on the totally reflecting surface $l^4$, which is inclined to $m°$, these two parts are rendered divergent. The divergence is so chosen as to cause the two parts of the axial ray reflected by the edge of $m$ to impinge on the edges of the cemented surface $l^3$. Hence only the two erect images, which are moved apart, are presented by reflection at the surfaces $l^1$ and $l^2$, which are inclined to each other, to the ocular, their divergence being neutralized, while the intermediate zone with the overlapping productions of the images is eliminated. The place of this zone is taken in the image-field by the part of the inverted image lying in the cemented surface $l^3$.

For the forming of the erect images, in the telemeter according to Figs. 11 and 12, two objective part-lenses $e^1$ and $e^2$ are employed, one of which $e^1$, which presents the lower erect image has the same focal length as the lens $e$, which presents the inverted image, and the other of which $e^2$, which presents the upper erect image has on the other hand a shorter focal length. The optical axes of both part-lenses lie parallel to each other in a plane perpendicular to the plane of triangulation. A horizontal diaphragm $e°$ prevents a mixing of the two erect images. The separating layer $h^3$ of the separating prism system $h^1$, $h^2$ has, as may be seen from Fig. 13, two separating edges. The part-lens $e^1$ and the lens $e$ are adjusted in their position as to height in such a manner that the lower limiting line of the inner single image-field forms the line of coincidence. The axis of the part-lens $e^2$ lies so far from that of the part-lens $e^1$ that the zone of the lower erect image, which is contiguous to the line of coincidence, is repeated in the remote outer image-field. In order to be able to use the upper single image-field, when locating the object whose range is to be found with the telemeter, particularly well like the image-field of a finder-telescope, that surface of the prism $h^1$, which carries the separating layer, is marked with a line $h^4$, delimiting in this single image-field that piece, which corresponds to that piece of the lower single image-field recurring in the said upper field.

In Figs. 14 to 16 the system is one, in which the so-called lost rays are utilized in the forming of the total image presented to the ocular. The ray-pencil-systems coming from the two ends of the base-line form two images in a separating prism system $p^1$, $p^2$, which contains a separating layer $p°$, reflecting on both sides and having an upper separating edge, on which edge the axial rays impinge, by which prism system the said two images are formed into two double images. By means of the collective lenses $g^1$ and $g^3$ and the lenses of reversion $g^2$ and $g^4$ these two double images are imaged in a second separating prism system $q^1$, $q^2$, to which a reflecting prism $r$ is cemented, with the help of a reflecting prism $s$ and the reflecting surface $q^3$ of the prism $q^1$ respectively. From the two copies of the double images two new total images are formed by the separating layer $q°$ in the well-known way, since it is reflecting on both sides. Each total image is derived as to one of its principal parts from one of the double images, as to its other principal part from the other one. In both total images the magnification is the same throughout. One total image remains unused, while the other one, after being reflected at $r$, fills the image-field of the ocular $i^1$, $i^2$. The separating layer $q^\circ$ is, according to Fig. 16, so disposed that the axial ray from the one double image, which has passed through $g^2$, impinges on its separating edge, the axial ray, however, which coming from the other double image has passed through $g^4$, is reflected at the said layer below the separating edge. The upper principal part of the total image made use of comprises the upper erect image belonging to the right-hand end of the base-line, the lower principal part comprises the lower erect image belonging to the same end and an inverted image belonging to the left-hand end, by which latter the inner single image-field is filled. The lower limiting line of the inner single image-field, which is an image of the separating edge of the first separating prism system $p^1$, $p^2$ (the first separating edge), forms the line of coincidence. The two erect images have such a relative position as to height, that that image-line of the erect image not contiguous to the line of coincidence, which corresponds to the image-line of the other erect image coinciding with the line of coincidence, coincides with the boundary-line of the first erect image. Hence the filling of the total image-field is that according to Fig. 1.

If, while retaining the disposition of the other parts as shown in Figs. 14 and 15, the separating layer $q^\circ$ be limited so that the separating edge has the position shown in Fig. 17, the upper principal part of the total image made use of comprises the upper erect image and an inverted one filling the inner single image-field, the lower principal part comprising the lower erect image. In this case the upper limiting line of the inner single image-field, which is also an image of the first separating edge, forms the line of coincidence, so that the filling of the total image-field is that according to Fig. 2. Finally, when the separating layer $q^\circ$ is given the disposition according to Fig. 18, in which the separating edge has as compared with Figs. 16 and 17 an intermediate position, the total image-field will be filled as shown in Fig. 19. The inner single image-field is in this case filled by two inverted images, which are contiguous in a line parallel to the base-line. The filling of the inner single image-field is such that it would be without a gap, if the sequence, in which the two inverted images follow each other in the total image-field, were reversed. The upper principal part of the total image made use of comprises the upper erect image and the upper inverted one, which are parted by one of the images ($a^1$) of the first separating edge, the lower principal part comprises the lower erect and the lower inverted image, which are parted by the other image ($a^2$) of the first separating edge. Each one of the images $a^1$ and $a^2$ of the first separating edge is a line of coincidence and may optionally be used for measuring purposes.

A smaller scale and by that means an enlarged field of vision in one of the two principal parts of the total image-field made use of may e. g. be obtained, by giving to the lens of reversion appertaining to this part a smaller focal length than to the other one and by approaching it nearer to the plane of the image-field of the ocular. When used for the upper principal part in a telemeter, in which the separating edge of $q^\circ$ has the same position as that shown in Fig. 18, this disposition produces a filling of the image-field such as that shown in Fig. 20. Such a filling has the special advantage of providing for the purpose of measurement two different magnifications in the same image-field, one or the other of which may optionally be employed according to the luminosity of the object, whose range is to be found.

I claim:

In a coincidence telemeter two objective systems, an ocular system, a measuring device and means for presenting in the field of vision of the said ocular system a total image-field comprising three single image-fields following each other in a direction perpendicular to that of the base-line, the two outer ones of which are each filled by an erect image and the inner one of which contains an image contiguous to one of the said erect images in a straight line parallel to the base-line, which straight line is a line of coincidence, these contiguous images belonging to opposite ends of the base-line and having the same magnification and the image-points of the erect image contiguous to the line of coincidence, forming this line, being visible also in the other erect image.

OTTO EPPENSTEIN.

Witnesses:
 PAUL KRÜGER,
 RICHARD HAHN.